US006856119B2

(12) United States Patent
Crawford (10) Patent No.: US 6,856,119 B2
(45) Date of Patent: Feb. 15, 2005

(54) SINGLE-STAGE POWER FACTOR CORRECTED CAPACITOR CHARGER

(75) Inventor: Ian D. Crawford, Longwood, FL (US)

(73) Assignee: Analog Modules, Inc., Longwood, FL (US)

(*) Notice: Subject to any disclaimer, the term of this patent is extended or adjusted under 35 U.S.C. 154(b) by 68 days.

(21) Appl. No.: 10/761,126

(22) Filed: Jan. 20, 2004

(65) Prior Publication Data

US 2004/0165403 A1 Aug. 26, 2004

Related U.S. Application Data

(60) Provisional application No. 60/441,461, filed on Jan. 21, 2003.

(51) Int. Cl.[7] .................................................. H02J 7/16
(52) U.S. Cl. ...................................................... 320/166
(58) Field of Search ................................ 320/166, 167; 323/222, 225, 282–285, 288; 307/109, 110

(56) References Cited

U.S. PATENT DOCUMENTS 6,737,847 B2 * 5/2004 Watanabe et al. ........... 323/288

OTHER PUBLICATIONS

Ochiai, et al, "An AC/DC Converter with High Power Factor", Toshiba Corporation, 6pp.
Rustom, et al, "Soft–Switching Single–Stage Power Factor Correction Converter", School of Electrical Engineering and Computer Science, University of Central Florida, 7pp.
Zhu, et al, "Large–Signal Modeling of a Single–Switch Power Factor Correction Converter", School of Electrical Engineering and Computer Science, University of Central Florida, 7pp, IEEE 0–7803–5695–0/00, (copr)2000.

* cited by examiner

*Primary Examiner*—Pia Tibbits
(74) *Attorney, Agent, or Firm*—Gerald E. Linden (57) ABSTRACT

Current (ip) flowing in the primary of a transformer in a full wave bridge converter is monitored and compared against thresholds (+imax, +imin, –imax, –imin). When the input voltage is adequate, the full wave bridge converter is operated in a normal manner. When the input voltage is insufficient to cause the current ip ramp reach the first threshold before a first predetermined timeout period (t1), the pulse is truncated and a next portion of the cycle is initiated and, providing that the current at the end of the first timeout period exceeds a second, lower threshold current (+imin), continuing to operate the full wave bridge converter in a normal manner. If the current at the end of the first timeout period fails to reach the second (+imin) threshold at the end of the timeout period (t1), then current in the primary winding is reversed and energy is stored in an inductor which is connected in series with the primary winding and said energy is transferred to a holding capacitor until sufficient voltage is stored to allow the converter to operate. The thresholds and cycle frequency are varied to allow a large power throughput variation that is used to modulate the input current for good power factor. The converter is designed to charge a capacitive load.

19 Claims, 5 Drawing Sheets

SINGLE-STAGE POWER FACTOR CORRECTED CAPACITOR CHARGER

CROSS-REFERENCE TO RELATED APPLICATIONS

This is a non-provisional filing claiming priority from Provisional Patent Application No. 60/441,461 filed Jan. 21, 2003.

TECHNICAL FIELD OF THE INVENTION

This invention relates to power supplies that charge and maintain a voltage on a capacitive load and, more particularly, to an AC-to-DC power Converter for charging a storage capacitor which is discharged periodically into an intermittent load, such as a pulsed flash lamp in a laser system.

BACKGROUND OF THE INVENTION

Many modern systems utilize power in a pulsed delivery mode, repeatedly supplying energy to an energy storage element, typically charging a storage capacitor, and rapidly delivering the stored energy into a load. For example, many medical lasers operate by delivering optical energy in a rapid-fire series of short laser bursts. Applications include eye surgery, cosmetic dermatology including hair removal, dentistry removing hard and soft tissue, and general surgery. These bursts are generated by rapidly discharging an energy storage element such as a capacitor into typically a flash lamp or laser diode array. The capacitor is repeatedly charged by a power supply unit (PSU) and discharged into the load. Other similar pulsed-mode power supply applications include strobe lights, such as those used for stop-motion photography, and pulsed beacons, such as those used on broadcasting towers, tall buildings, aircraft, laser rangefinders, laser designators, pulsed electromagnets, pulse forming networks, etc. In many applications, the capacitor is not completely discharged.

To meet specifications requiring reduced levels of harmonics caused by input currents of power supplies, a power factor corrector circuit is required. As is known, a power factor corrector circuit ensures that the AC current waveform follows the magnitude of the AC voltage supply to give a close to unity power factor. In addition, the AC current and voltage waveform, normally sinusoidal in shape, should be free from sudden changes or transients due to load surges, as such distortion can also affect the power factor and cause an increase in measured rms current drawn.

In typical prior art, a boost converter generates a regulated DC voltage on a capacitive storage bank from which the capacitor charging power converter operates. This requires essentially two power supplies with two sets of magnetic components, power switches, diodes etc., both sets capable of operating at or above the maximum output power level.

Reference is made to commonly-owned U.S. Pat. No. 6,087,811 ('811 patent), incorporated in its entirety by reference herein.

BRIEF DESCRIPTION (SUMMARY) OF THE INVENTION

It is a general object of the present invention to provide a simple power-factor-corrected single converter to charge and regulate a capacitive output load, where the load acts as the reservoir storage device allowing the power delivery and demand to vary throughout the mains cycle in such a manner as to maintain a unity power factor.

It is a further object of the disclosure to provide a converter with a widely adjustable power delivery so that the current from the mains may be drawn smoothly without large peaks during the charging of capacitors for pulsed load applications such as flashlamps or pulsed laser diodes.

To overcome the aforementioned problem of requiring two power supplies, in cases where the output load is capacitive, for example, laser pulse-forming networks or energy storage capacitors where a capacitor is charged by the power supply then discharged into the load, it is a specific object of the invention to provide a single stage converter resulting in a substantial cost, size, and weight saving. The power delivery of this converter is controlled during the mains cycle for unity power factor, and may also be controlled as disclosed in the '811 patent to achieve a high power factor during the cycles of charging and subsequent discharge into the load.

According to the invention, the basic converter topology is a high full wave bridge. The input alternating voltage is full wave rectified but is not smoothed at the mains frequency. In its unfiltered condition, without first being smoothed (filtered), this waveform is scaled and used to demand an input current level from the single stage variable power converter as described below in text and FIGS. 1 to 3. If the input current draw is proportional to the instantaneous sinusoidal mains voltage level, then a unity power factor condition results.

Figure 1:
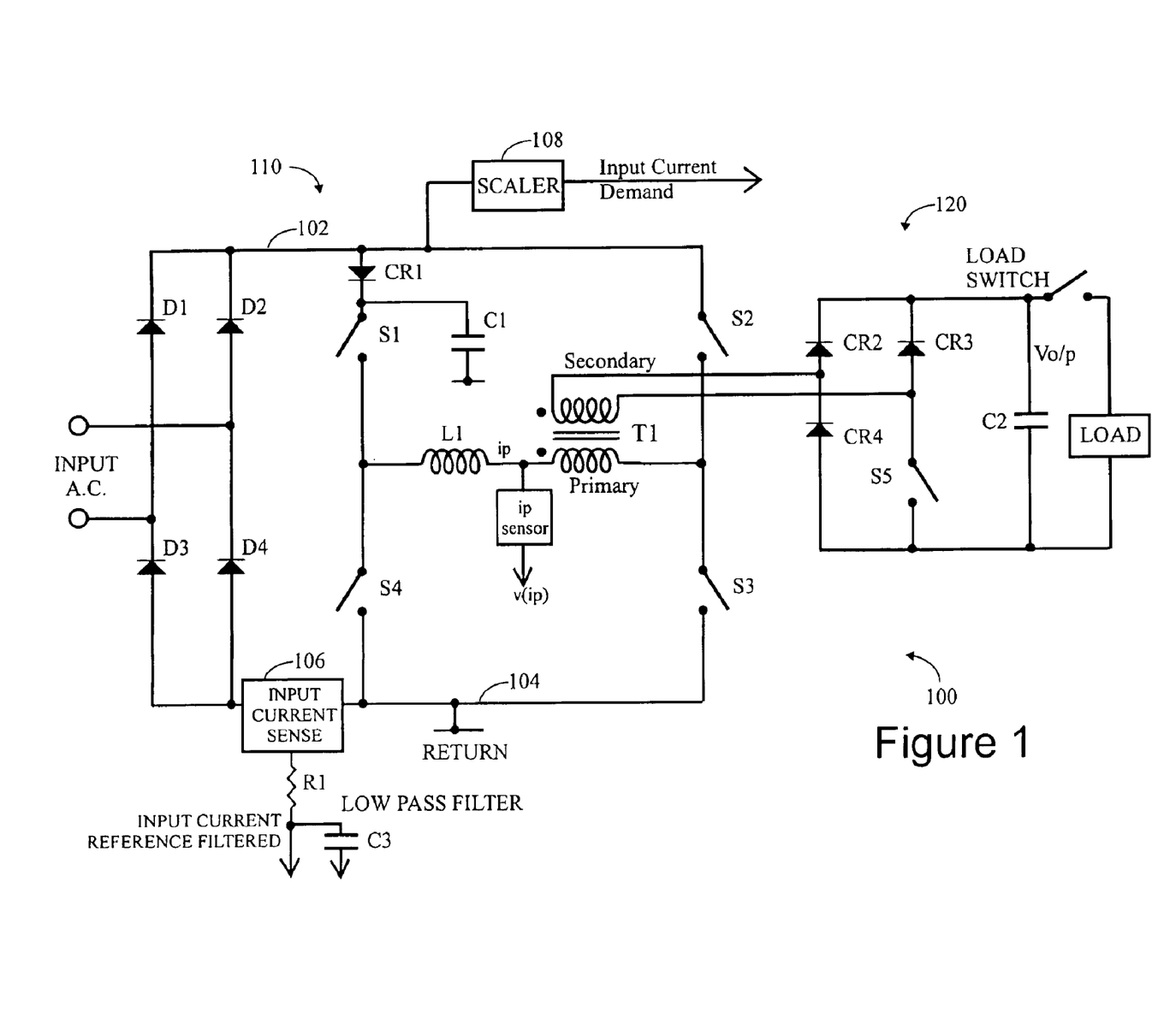
FIG. 1 is a schematic diagram of a power supply connected to a load, according to the invention. The components are connected as shown.

To achieve this desirable result, the converter must be capable of being commanded to draw a wide range of currents regardless of output voltage or input voltage. Conventional bridge power supplies are not capable of operating when the output voltage is high and/or the input voltage is low. To draw current through the power switches, inductor and transformer primary as schematically shown in FIG. 1, the instantaneous input forcing voltage must exceed the output voltage as reflected through the transformer (back-EMF). Consequently, a normal bridge converter shuts down when this condition is not met resulting in a discontinuous input current flow and therefore a poor power factor.

Conventional power supplies are designed to drive a constant voltage output load, but capacitor charging power supplies or converters have to work efficiently from zero to maximum output voltage requiring control circuits that are adaptable to this changing situation. The power factor corrected converter of the present invention works as a "normal" full wave bridge converter when there is input voltage available sufficient to drive current through the inductor and the transformer primary. A test for this is done during the first half cycle of the full wave bridge converter switching sequence, typically of a few microseconds duration. If the current fails to reach a minimum value, then the second half-cycle topology is changed to actively switch one of the output rectifiers (e.g., S5) into a conducting state thus effectively shorting (short circuiting) the transformer secondary. Energy is stored in a primary inductor (L1), which may be the leakage inductance of the transformer T1, and is then transferred into a storage capacitor (C1). This stored energy provides a boosted supply voltage for a subsequent first half-cycle to operate from when the input line voltage is low. Each new cycle repeats this test. The wide range of power control is achieved firstly, by modulating the peak current demand, and then secondly, by adding a time delay before initiating the next cycle when the peak current is below a lowest allowed value. Power factor correction is achieved by forcing the power demand to make the input current averaged over many switching cycles (several microseconds duration per cycle) match the shape of the sinusoidal instantaneous input voltage waveform (several milliseconds duration per cycle typically).

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments.

Conventional electronic components may be labeled with conventional schematic-style references comprising a letter (e.g., A, C, R) indicating the type of electronic component (e.g., amplifier, capacitor, resistor, respectively) followed by a number indicating the iteration of that element (e.g., "1" meaning a first of typically several of a given type of electronic component). Components such as resistors and capacitors typically have two terminals, which may be referred to herein as "ends". In some instances, "signals" are referred to, and reference numerals point to lines that carry said signals.

The structure, operation, and advantages of the present preferred embodiment of the invention will become further apparent upon consideration of the following description taken in conjunction with the accompanying drawings.

DETAILED DESCRIPTION OF THE INVENTION

Power Supply—FIG. 1

FIG. 1 illustrates a power converter 100. The overall power converter 100 generally comprises (i) a power stage 110 comprising a bridge rectifier, four switches and a transformer, followed by (ii) a rectifier stage 120 comprising a bridge rectifier, as described in greater detail hereinbelow. The converter 110 is for charging a capacitor C2 that operates (discharges into) a load (LOAD).

In the power stage 110, alternating Current (AC) from a main power source, such as a public utility company, for example 110 VAC or 220 VAC at 60 Hz, is bridge-rectified by four diodes D1, D2, D3 and D4 to provide full wave rectified DC between the lines 102 (+) and 104 (−).

Current being supplied is sensed by an input current sense circuit (INPUT CURRENT SENSE) 106 in the return (RETURN) line 104, the output of which is filtered by low pass filter (LOW PASS FILTER) comprising resistor R1 and capacitor C3. See FIG. 3, "input current reference filtered" signal.

A scaling circuit (SCALER) 108 connected to the power line 102 provides a signal representing the input voltage and therefore indicative of the desired input current demand.

A diode CR1 is connected between the power line 102 and one pole of a switch S1. The other pole of the switch S1 is connected to a one pole of a switch S4. The other pole of the switch S4 is connected to the return line 104, after the Input Current Sense circuit. A capacitor C1 is connected between the junction of the diode CR1 and the switch S1, and ground (i.e., the return line 104). A one pole of a switch S2 is connected to the line 102. The other pole of the switch 102 is connected to a one pole of a switch S3. The other pole of the switch S3 is connected to the return line 104. The four switch devices S1, S2, S3, and S4 are preferably FET transistors, but may be IGBT's, bipolar transistors, or any other electronically-controlled switch. The timing of the opening and closing of these four switches S1, S2, S3, S4 switches is discussed below.

The diode CR1 allows the capacitor C1 to store flyback energy from L1 in Sequence 3 (described below) when the power line is instantaneously low normally when the sine wave is near zero. CR1 is then reverse biased. Sequence 3 repeats until C1 has a high enough voltage to power the converter in Sequence 1 or 2 (described below) and transfer its stored energy to the load with S5 acting as a rectifier, not an output short.

An inductor L1 has one end connected to the junction of the two switches S1 and S4. The inductor L1 need not be a separate component—rather it could be incorporated fully or partially as the leakage inductance of transformer T1 as long as it is effectively in series with the transformer primary. The other end of the inductor L1 is also connected to a one end of a primary winding of a transformer T1. The other end of the primary winding (PRIMARY) of the transformer is connected to the junction of the switches S2 and S3. The secondary winding (SECONDARY) of the transformer powers the load (LOAD), via an output rectifier stage, as described hereinbelow.

Current ip flows in the inductor L1 and transformer primary, and is sensed with a current transformer, Hall-effect sensor, or similar means (ip sensor), to give a voltage v(ip) proportional to current flow.

Output Rectifier Stage

There has been described, above, a power stage of the power supply. An output rectifier stage 120 of the power supply comprises three diodes CR2, CR3, CR4, a storage capacitor C2, a synchronous switch S5, and an output switch (LOAD SWITCH), connected as shown. The anode of CR2 is connected to the cathode of CR4. The cathode of CR2 is connected to the cathode of CR3, to one plate of the capacitor C2, and to one pole of the load switch. The other pole of the load switch is connected to one end of the LOAD. The anode of CR4 is connected to a one pole of the switch S5, to the other plate of the capacitor C2 and to the other end of the LOAD. (When the load switch is closed, the capacitor C2 discharges into the LOAD.) The other pole of the switch S5 is connected to the anode of CR3. A one end of the secondary winding of the transformer T1 is connected to the junction of the anode of CR2 and the cathode of CR4. The other end of the secondary winding of the transformer is connected to the junction of the anode of CR3 and the other pole of the switch S5. The three diodes CR2, CR3, CR4 and switch S5 are connected to function as a bridge rectifier, and the secondary of the transformer T1 is connected to the "input" (junction of CR2/CR4, junction of CR3/S5) of the bridge rectifier. The capacitor C2 is connected, and the load (LOAD) is connected via the load switch (LOAD SWITCH), to the "output" (junction of CR2/CR3, junction of CR4/S5) of the bridge rectifier.

Variations of this output circuit are possible. The output polarity may be reversed, the LOAD SWITCH may be inserted between the LOAD and C2, and synchronous switches may replace the output rectifiers CR2, CR3 and CR4. This does not affect the basic principles described here as long as the timing and waveform relationships are maintained.

The capacitor C2 is comparable to the capacitor 220 of the '811 patent. It is essentially an energy storage element. The load (LOAD) is comparable to the load 220 of the '811 patent. The output switch (LOAD SWITCH) is comparable to the switch 240 of the '811 patent.

Control Circuit

Figure 3:
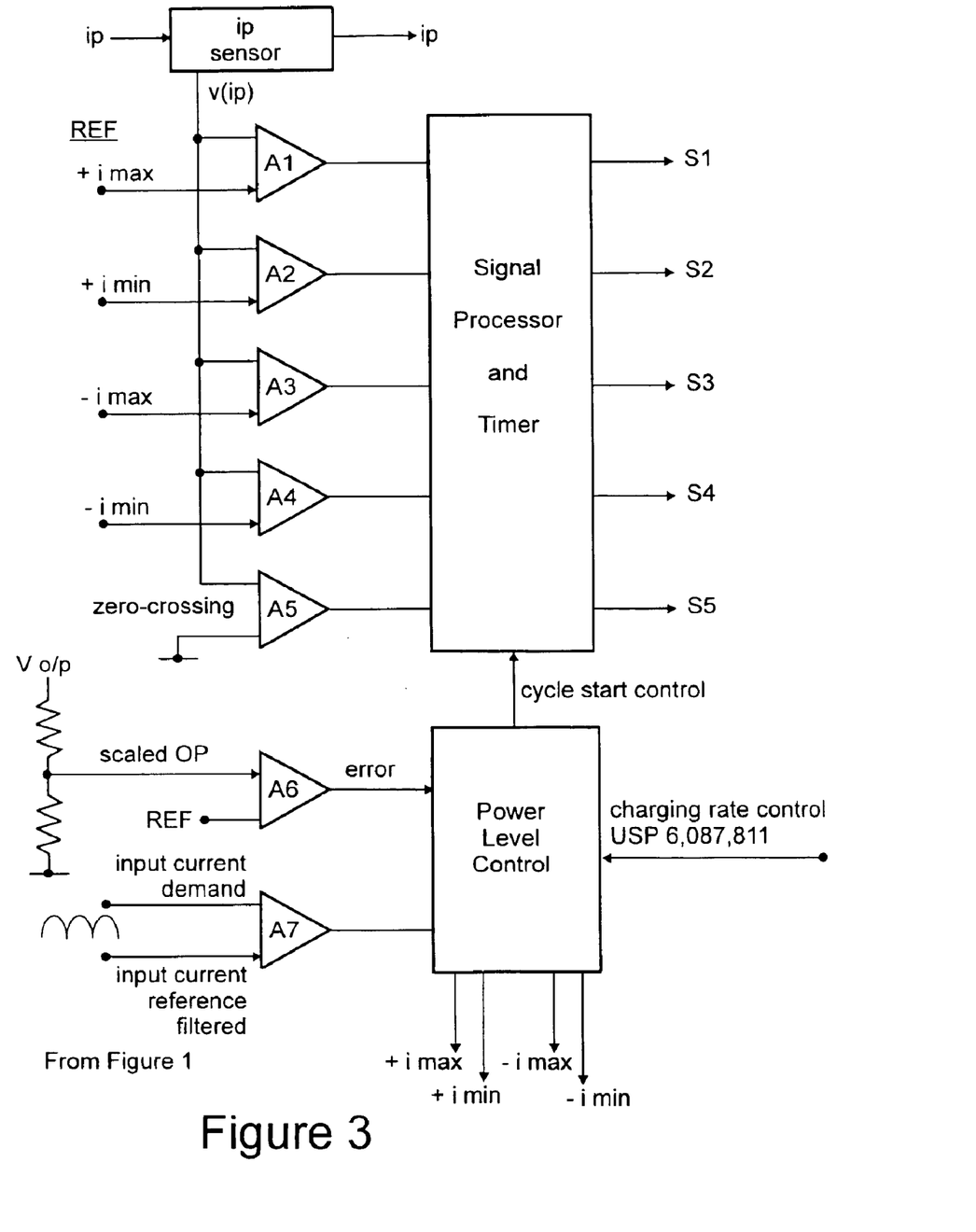
FIG. 3 is a schematic diagram of a circuit for controlling the operation of the power supply of FIG. 1, particularly the various switches S1, S2, S3, S4, and S5, described therein, according to the invention. The components are connected as shown

FIG. 3 illustrates a circuit for controlling the operation of the power supply 100, particularly the operation of the switches S1, S2, S3, S4 and S5. The circuit comprises the ip sensor of FIG. 1, fast comparators A1, A2, A3, A4, A5, a signal processor and timer, amplifiers A6, A7, and a power level control (PLC) circuit. The signal processor has five outputs, each for controlling a selected one of switches S1, S2, S3, S4, S5.

The signal v(ip), indicative of the magnitude and polarity of current in the primary winding of the transformer TI (FIG. 1) is provided to one input of each of the comparators A1, A2, A3, A4, A5. A threshold signal corresponding to +i max is connected to the other input of A1. A threshold signal corresponding to +i min is connected to the other input of A2. A threshold signal corresponding to –i max is connected to the other input of A3. A threshold signal corresponding to –i min is connected to the other input of A4. A threshold signal corresponding to ip=zero-crossing is connected to the other input of A5.

Modes of Operation

Figure 2A:
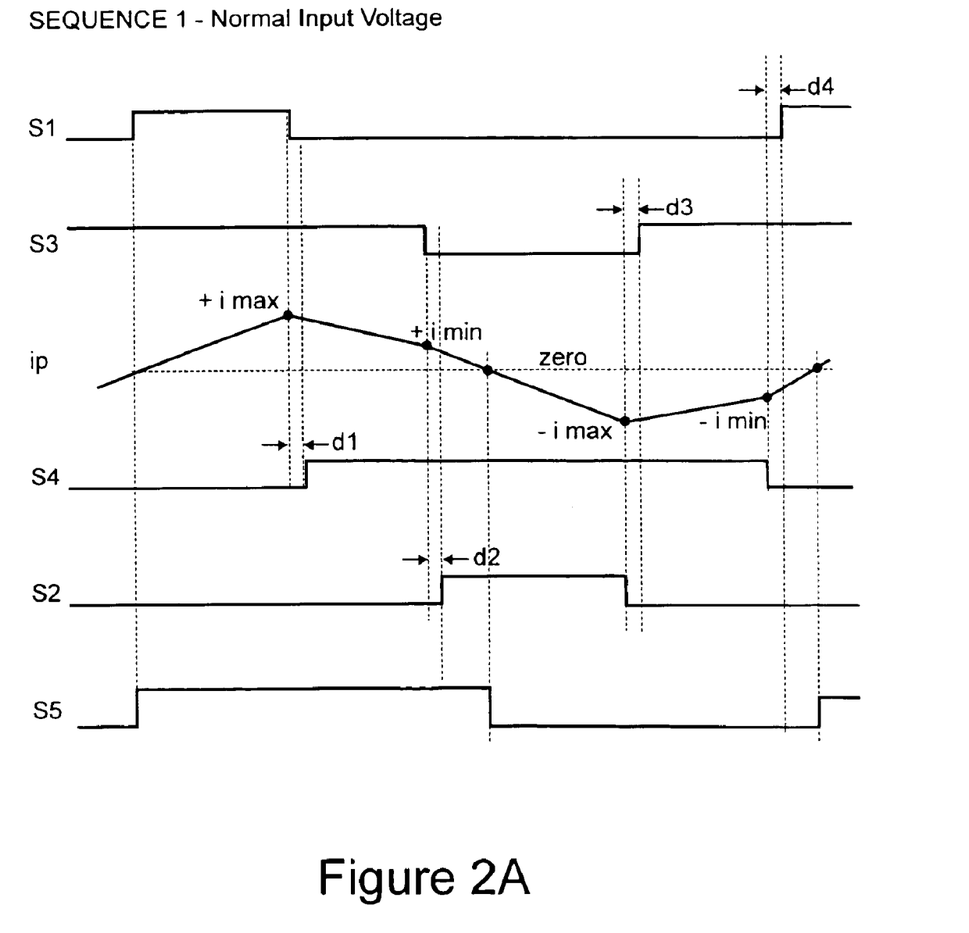
FIG. 2A is a timing diagram showing operation of the power supply under high instantaneous input voltage conditions, according to the invention. The horizontal axis is time. The levels of various signals (S1, S3, ip, etc.) are shown on the vertical axis.
Figure 2B:
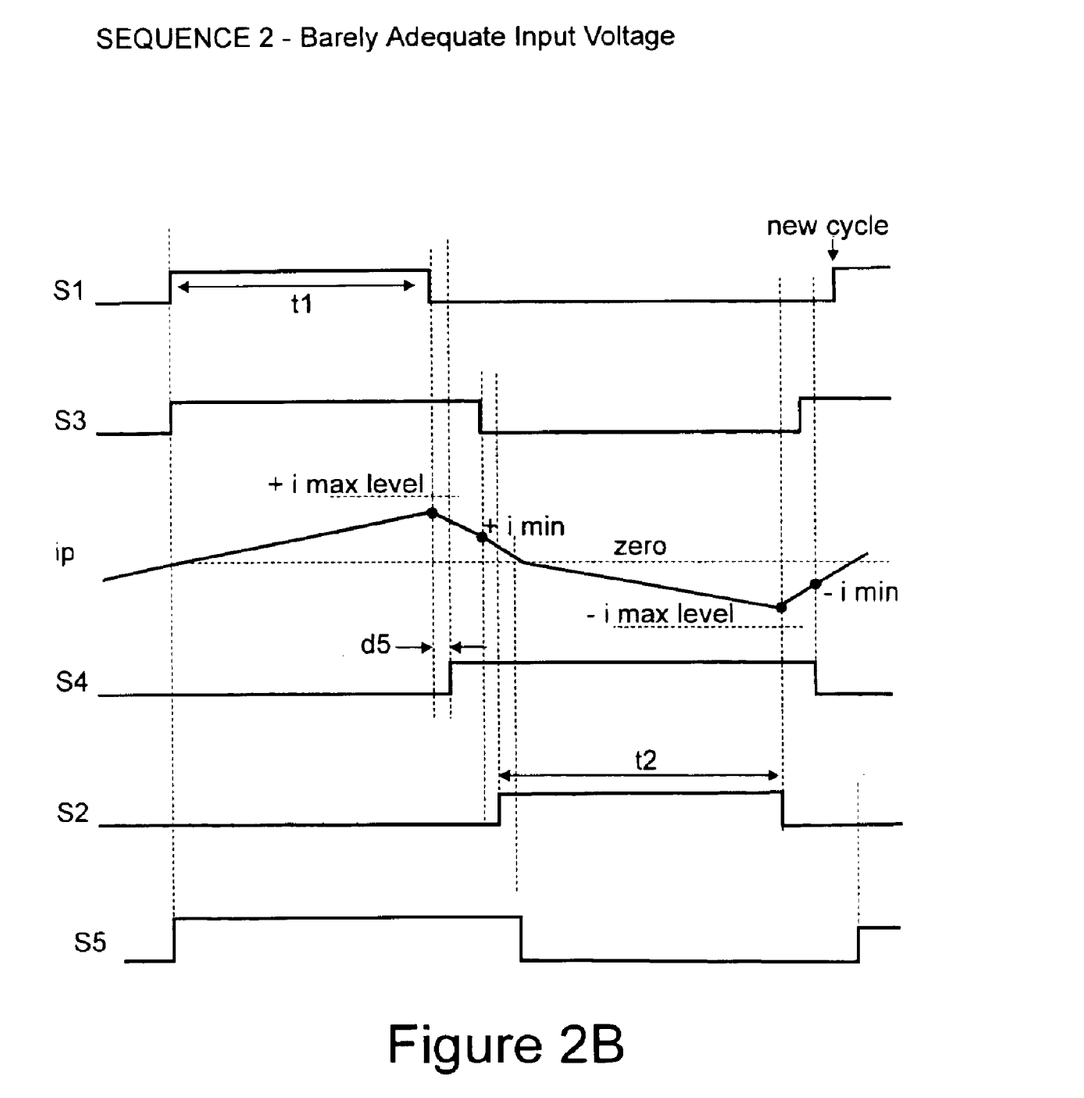
FIG. 2B is a timing diagram showing operation of the power supply under conditions of a barely adequate input voltage, according to the invention.
Figure 2C:
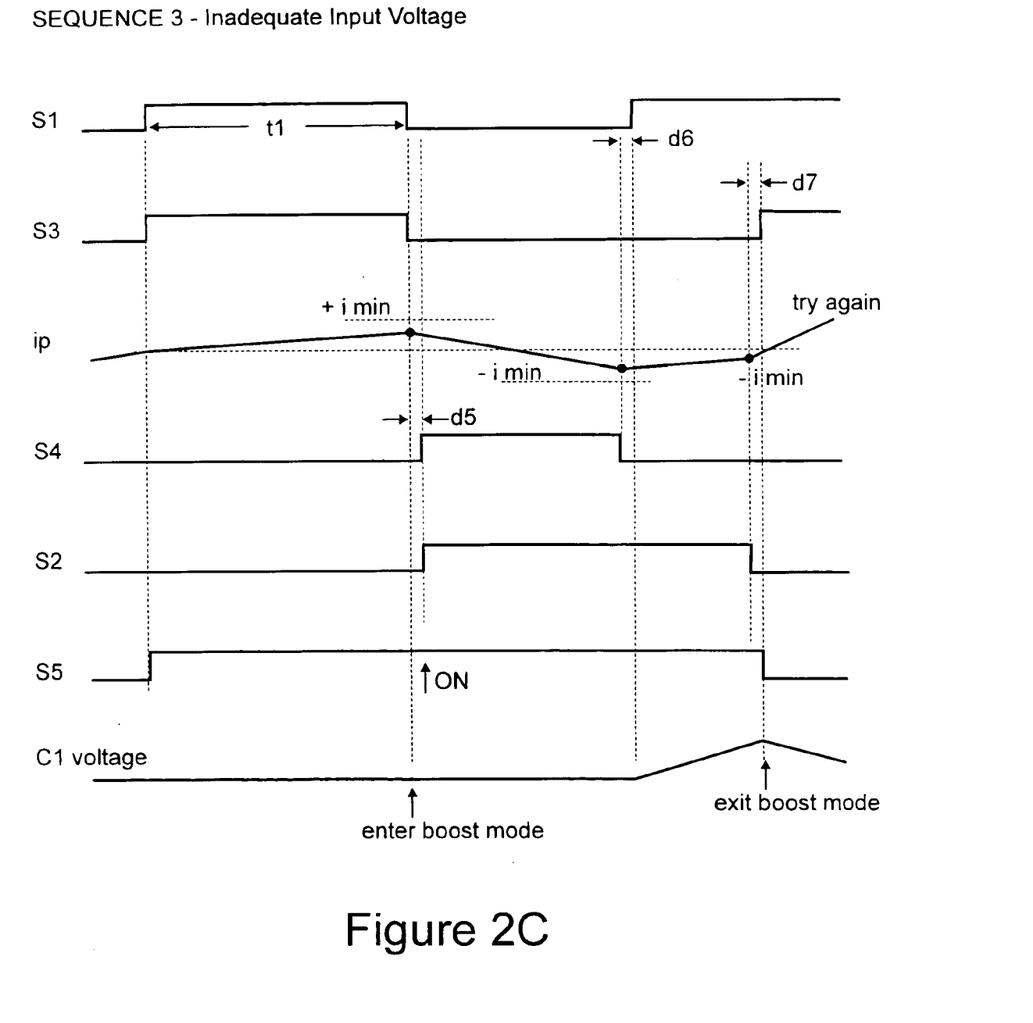
FIG. 2C is a timing diagram showing operation of the power supply under conditions of inadequate or instantaneously low input voltage, according to the invention.

There are now described various sequences, or modes of operation, for different situations of instantaneous input voltage. A first sequence (Sequence 1) is shown in FIG. 1, for conditions of adequate input voltage. A second sequence (Sequence 2) is shown in FIG. 2, for barely adequate input conditions—namely, insufficient input voltage to reach +imax, as described below. A third sequence (Sequence 3) is shown in FIG. 3, for inadequate input voltage—namely, insufficient input voltage to reach +imin, as described below. Each sequence (figure) represents a single switching cycle. There are typically at least 100,000 (e.g., 150,000) switching cycles per second. Current ip is controlled during each switching cycle. For an AC input voltage at 60 Hz, the full wave rectified DC is at 120 Hz (power cycle). Therefore, for example, 150,000 switching cycles divided by 120 Hz will yield up to 1250 switching cycles per power cycle (At very low ip levels, some switching cycles may be suppressed). In this manner, current ip can be well controlled.

Sequence 1—Adequate Input Voltage—FIG. 2A.

This sequence is initiated by turning on (closing) the switches S1 and S3 as is shown by the one level turn-on drive signals in FIG. 2A. (S3 will normally already be on from a previous cycle.) Dealing first with the case when the primary forcing voltage is sufficient to overcome the back-EMF, the current ip ramps up as magnetic flux builds in the inductor L1 (current ip=voltage across the inductor, times time/inductance value). The reflected capacitance of the output load (LOAD) makes the primary winding look like a low impedance to alternating currents, but current flows through rectifier CR2 and closed switch S5 to charge the load capacitor, C2. When current ip reaches +imax, as sensed by comparator A1 in FIG. 3, S1 is turned off (opened). Switch S5 is turned on when ip crosses zero and goes positive (+), and is turned off when ip crosses zero to negative (–).

After a short delay d1, the switch S4 is turned on. As is known, this delay prevents cross-conduction which would occur if S1 and S4 were to be on simultaneously. Current continues to flow in switch S3, the transformer T1, inductor L1 and the switch S4. By setting an appropriate time delay (d1), zero voltage turn on of S4 is possible, and similarly for the other switch voltage transitions, thus reducing switching losses. The circulating current, ip, falls as energy is transferred to the output capacitor through the transformer T1. When +imin value of current is reached as sensed by comparator A2 in FIG. 3, then S3 is turned off.

After a short delay d2, typically similar to d1 and around 100 nanoseconds (ns), the switch S2 is turned on and the current (ip) and flux in the inductor L1 passes through zero as the voltage across inductor L1 is reversed. Current builds up in the opposite direction by flowing from the rectified line 102 through switch S2, transformer primary, inductor L1, and switch S4 to the return line 104. Similarly to the first half cycle described above, when the current ip reaches a value of –imax as sensed by comparator A3, then S2 is turned off and, after a short delay d3, typically similar in time to d1 and d2, the switch S3 is turned on. The circulating current ip is coupled to the transformer secondary and flows into the capacitor C2 via rectifiers CR3 and CR4. From the stored energy in inductor L1, current continues to circulate through the switch S4, inductor L1, transformer T1 primary and S3 until –imin is reached as sensed by comparator A4. At this time S4 is turned off and after a short delay d4, typically similar in time to d1, d2 and d3, a new cycle may be initiated by turning on S1 (as described above). S3 is already on to begin a new cycle. Each cycle lasts typically several microseconds to allow a switching frequency above 100 KHz so that the inductor and transformer sizes are kept small.

In general, for normal input voltage: S1 and S3 are turned on. When the current increases to +imax, S1 is turned off and S4 is turned on. When the current decreases to +imin, S3 is turned off and S2 is turned on. Then the current passes through zero. When the current increases to –imax, S2 is turned off and S3 is turned on. When the current decreases to –imin, S4 is turned off and S1 is turned on.

By way of example, typically the maximum currents are 10 amps or greater. C2 value is 10 microfarads or more, and C1 is in the microfarad range, smaller than C2. L1 is approximately 10 microhenries to allow the current ip to build up in a few microseconds.

The output rectifier comprises three rectifier diodes, CR2, CR3, CR4, and a synchronous switch S5 connected as a full-wave bridge rectifier. A zero-crossing comparator A5 senses the direction of current flow in the transformer primary. The switch S5 is turned on with positive current flow in the direction of S1 to S3. The function of this switch S5 will be apparent in Sequence 3. In Sequence 1 and 2, the switch S5 acts as a synchronous rectifier, and may therefore be referred to as a "rectifier" in this description. The cycle sequences continue until the load capacitor C2 is fully charged or until the input voltage falls to a level that cannot overcome the back-EMF to drive current through the transformer T1 into the capacitor C2. It should be noted that as the capacitor C2 charges, the timing and shape of the waveforms will change. Initially, at low capacitor C2 voltage, the first ramp will exhibit a large rate of rise of current ip due to the low back-EMF and consequent high voltage across the choke L1. At high output voltages on capacitor C2, the rate of rise of current ip is slow due to the larger back-EMF and consequential low voltage across the choke L1. Similarly, the shapes of the current waveform will change as the line voltage varies. Limits are put on the time intervals by a pulse width timeout on both the positive and negative going rising current ramps. The limits may be selected to control the frequency of operation; jitter in time to help meet EMI regulations; and/or control the magnetic flux cycle in the transformer to avoid saturation. Full power may not be possible in all circumstances, for example with zero voltage on capacitor C2 and in these circumstances, the maximum peak currents are selected by error amplifier A7 to achieve the best possible results. The initial current ramp (S1 S3 on) timeout triggers a sample of primary current to determine when to move into a different cycle as described below. Operation in Sequence 1, 2, or 3 depends on the instantaneous input voltage and the instantaneous output voltage, with a prime driver being the instantaneous value of the full wave rectified half sine input voltage.

Sequence 2—Barely Adequate Input Voltage (FIG. 2B)

When the input voltage is insufficient to cause the current ip ramp reach the +imax threshold before a predetermined timeout period, t1, then the S1 drive signal is truncated, causing the next portion of the cycle to initiate (turn off S1, turn on S4). Provided the current at timeout exceeds +imin, the cycle continues as in Sequence 1 above, with a likely similar timeout limit applicable, t2, on the second half of the cycle (−imax threshold). This sequence continues as long as the current ramp does not reach +imax, but exceeds +imin at time t1 on the first half cycle. (S2 turns off at t2, S3 turns on after a short delay, S4 turns off at −imin.) Levels for +imax and −imax (which are not attained) are shown in the figure. The timeout periods t1 and t2 are each suitably approximately 5–10 microseconds. (FIG. 2B is similar to FIG. 2A, except timeout is used rather than reaching −imax.)

Sequence 3—Inadequate Input Voltage (FIG. 2C)

This cycle starts out as in Sequence 1. If the current ip fails to reach the +imin threshold at the timeout t1 of the initial ramp, then the cycle protocol is changed to Sequence 3, see FIG. 2C. S1 and S3 are switched off and after time d5, typically 100 ns, switches S4 and S2 are turned on. Switch S5 should already be on due to initial current flow in the transformer primary (from left to right, winding dot positive). Levels for +min and −min (which are not attained) are shown in the figure.

The primary current reverses and builds up in the opposite direction with low impedance across the transformer primary because the transformer secondary is shorted out due to switch S5 and diode CR4 conduction. Current ramps up in inductor L1 until −imax is reached. Then, S4 is turned off and S1 is turned on after a delay d6, typically around 100 ns, to allow the voltage at S1/S4/L1 node to rise to the potential of C1. C1 is held just below input line potential by forward biased diode CR1 during Sequence 1 and 2, and has little effect then except for a slight voltage drop. Now, current flows into C1 through S1 from the energy stored in inductor L1 causing an increase in potential of C1 and reverse biasing diode CR1. The current in inductor L1 decays as energy is transferred and when it reaches −imin, S2 is turned off. After a delay d7, typically 100 ns, S3 is turned on ready to try a new cycle with S1 and S3 on. If the voltage on C1 (S1) is sufficient, then Sequence. 1 or 2 will occur. If the voltage on C1 is insufficient to allow Sequence 1 or 2 to reach +imax, or >+imin respectively at time t1, then Sequence 3 will repeat as necessary until the stored voltage on C1 is high enough to allow depletion of the charge on C1 by Sequence 1 or 2. Because the reflected voltage on the transformer primary is held very low when S4, S2 and S5 are on, this voltage boost cycle operates down to almost zero input line voltage. Collected energy on C1 is transferred to the capacitor C2 during the first half of each cycle when the voltage on C1 is sufficient to overcome the back-EMF reflected through the transformer turns ratio to the primary as described in Sequence 1 or 2. As the input half sine voltage rises, diode CR1 becomes forward biased and the converter operates directly from the input line again.

Regulation.

There are two modes of regulation; output and input controlled. A common factor is the ability of the converter topology to vary its power level from maximum to zero. This is achieved by controlling the maximum current thresholds +imax and −imax from a maximum value to just above +imin and −imin values. In a practical design, imin may be set to be the minimum current required to discharge the switch capacitances in the time delays d1 to d4 thus achieving zero voltage switching. For lower power levels, the start of a new switching cycle is delayed, thus reducing the average power delivery. With all four switches S1, S2, S3, S4 off, the inductor L1, transformer T1, and circuit capacitances together with circuit inductances cause resonant ringing at the switch nodes. It is desirable for the highest efficiency at low power to turn on, for example, S1 and S3 when the instantaneous voltage at the switches is high at S1 and low at S3. This may be achieved by several methods.

If the period of a resonant cycle is t3, then the new cycle may be initiated at a time that is a multiple of t3 plus a time offset later to coincide with the desired phase at S1/S3 turn-on, thus minimizing switching losses. An alternative method is to sense the voltage at S1 or S3. One convenient way to implement this is to sense a zero voltage crossing or, preferably, a zero current crossing in the inductor L1 using existing comparator A5, then add a time t4 when the instantaneous voltage is known to be in the desired polarity and close to the peak. Alternative methods will be apparent to those experienced in the art. As the ringing decays, this issue is less important because the overall start-up switching losses are small anyway due to the low duty cycle. In summary, as reduced power is demanded, the peak currents are reduced, and then switching cycles are missed below a predetermined minimum value of current. The opposite sequence occurs for a for a demanded power increase. Comparators and a timer/processor as shown in FIG. 3 control these operations.

Power Control

To regulate the output, an error amplifier A6 compares a sample of the output voltage ("scaled OP" from the output voltage Vo/p across capacitor C2) with a demanded reference voltage (REF). The output of the error amplifier A6 adjusts the power level control described above and then down to zero if necessary to maintain a regulated output. The output regulation overrides the input regulation as described below. The input regulation provides a way to create a unity power factor. The full wave rectified input line voltage is scaled and used as an input current demand reference. The input line current is sensed, normally with a small value resistor or Hall effect sensor. Smoothing is applied by means of a low-pass filter (for example R1, C3) to eliminate high frequency variations due to switching noise, and the resulting value is compared with the input current demand reference using amplifier A7. To operate the converter at maximum power, the peak current demand at the crest of the half sine full-wave rectified waveform is made equal to the maximum power deliverable as set by the maximum ratings of the switches and associated components. This may be done by setting fixed scaling ratios if the RMS input voltage is not expected to vary much. Preferably, the maximum power is controlled by adjusting the scale factor of the demanded input line current to control the power delivery of the converter to charge the output capacitor completely just before load discharge or to match the output load conditions so that the power converter operates continuously at the lowest possible power levels, rather than in spurts. This method of controlling the charging rate is described more fully in the '811 patent, and provides a charging rate control signal into the power level control input of the converter (see signal on line 252 in '811 patent).

The charging rate control signal is suitably provided by the controller 250 of the '811 patent. As described therein, the output of the power supply unit (PSU) 210 can be controlled (i.e., decreased from a maximum rated output) by the controller 250. In a general sense, the controller 250 can control the rate of energy delivery by the PSU 210 to the energy storage device (capacitor) 220.

The controller 250 of the '811 patent may be implemented as a digital controller, suitably programmed to achieve the described results. For example, a look-up table associated with the controller 250 can store multi-dimensional data regarding charge rates, discharge rates, pulse periods, characteristics of the capacitor and PSU, and the like, to control the operation of the PSU according to pre-set recipes. Alternatively, algorithms can be implemented to control the operation of the PSU. Additionally, user inputs can be provided to set initial or nominal operating characteristics of the load device 230. Additionally, line voltage variations can be monitored so that the controller can "anticipate" and compensate for effects of line voltage variations on input power factor.

The scale factor of the full wave rectified sinusoidal current demand may be controlled by a linear multiplier, a variable gain amplifier, by digitally controlled switches, or by a digital signal processor. The current demand shape is preserved, but the amplitude is controlled by an external signal. The external control signal will preferably have a fate of change slower than the mains frequency, so that the half sine waves are not unduly distorted by scale changes. The maximum gain of the scaling device in the power level control block is set to limit the peak and average currents to safe values for the converter.

The charging rate control signal may be used to adjust the rate of charge during the capacitor charging period to achieve full regulated charge just before the predicted desired time (normally that of LOAD switching), or to creep up on the regulation point with a reduced power to avoid over shoot and give enhanced accuracy of regulation. Ultimately though, the output regulation loop via amplifier A6 will turn off the converter when the desired voltage is reached by setting the current demand to, or close to zero, thus preventing new switching cycles.

In summary, a converter is disclosed to operate over a wide range of input and output voltages to charge and regulate a capacitive load. By adjusting the power levels over the input sinusoidal waveform and output capacitor charging ramp, good power factors may be achieved. Note that the capacitor charging current will normally have a 120 Hz modulation as the power level varies to make the mains input current draw sinusoidal.

Practical Implementation.

The power switches S1, S2, S3, S4 may be FETS, IGBT's, bipolar transistors, or any electronic switching devices controlled by an external signal. To operate at high frequencies allowing smaller magnetic devices, FETS are preferred. Inductor L1 and transformer T1 are designed not to saturate at the maximum current flowing. The ip sensor may be a toroidal transformer with a single turn primary and multiple turn secondary driving a load resistor or, alternatively, a Hall-effect sensor. The input current sensor may be a Hall-effect sensor, low value resistor, or a toroidal transformer if the primary winding is moved to the alternating current input to the bridge rectifier. Synchronous rectifier S5 may be a FET, IGBT, bipolar transistor or any other electronically controlled switch device. A FET is preferred due to its fast switching speed and high voltage availability. The scaler (SCALER) may simply be a precision resistor chain to divide down the input voltage to a value suitable for the control electronics. As a practical matter, a capacitor and/or filter is provided on the rectified output of the mains so that high frequency switching noise is not conducted into the mains input. This filter does not affect the theory of operation and is omitted for clarity.

The control circuits in FIG. 3 may be analog or digital. Fast comparators A1 to A5 look at a voltage representation of the instantaneous primary current ip in magnitude and polarity. The references (+imax, +imin, −imax, −imin) to fast comparators A1 to A4 are provided by the Power Level Control outputs (+imax, +imin, −imax, −imin), setting the current levels as described in the Sequences (1,2,3) above. The comparators A1 to A4 provide a digital level change output when the instantaneous value of ip crosses the reference level. These outputs, together with the output of polarity sensing comparator A5, are converted to five switch drive waveforms as shown in FIGS. 2A–2C.

A clock in the Power Level Control block starts each cycle (cycle start control) and sets the four reference levels A1 to A4 (+imax, +imin, −imax, −imin) as required to match the converter power level to the demanded power level from the charger rate control and input current demand. The functions described may be implemented using substantially analog circuits such as multipliers, scaling and error amplifiers, monostable timers, or by substantially digital processing using, for example, a fast gate array with A/D converters. Together, the power converter 100 of FIG. 1 and the control circuits of FIG. 3 constitute an overall power factor corrected capacitor charger.

Although the invention has been illustrated and described in detail in the drawings and foregoing description, the same is to be considered as illustrative and not restrictive in character—it being understood that only preferred embodiments have been shown and described, and that all changes and modifications that come within the spirit of the be protected. For example, polarities of components could be reserved, etc.

What is claimed is:

1. A power factor corrected capacitor charger comprising:

a full wave bridge rectifier receiving AC mains power and providing a full-wave rectified DC waveform on a power line and a return line;

a first switch having a first pole and a second pole;

a second switch having a first pole and a second pole;

a third switch having a first pole and a second pole;

a fourth switch having a first pole and a second pole;

a first diode having an anode and a cathode;

a capacitor having a first pole and a second pole;

an inductor;

a transformer comprising a primary winding and a secondary winding, the secondary winding powering a load;

wherein:
the anode of the first diode is connected to the power line;
the first pole of the first switch is connected to the cathode of the first diode and to the first pole of the capacitor;
the second pole of the capacitor is connected to the return line:
the second pole of the first switch is connected to the first pole of the fourth switch and to a first end of the inductor;
a second end of the inductor is connected to a first end of the primary winding of the transformer;
the second pole of the fourth switch is connected to the return line;
the first pole of the second switch is connected to the power line;
the second pole of the second switch is connected to the first pole of the third switch and to a second end of the primary winding of the transformer.

2. A power factor corrected capacitor charger, according to claim 1, further comprising:
means for sensing current flowing through the primary winding, and for providing a signal indicative thereof.

3. A power factor corrected capacitor charger, according to claim 2, wherein:
the means for sensing current is selected from the group consisting of current transformer and Hall-effect sensor.

4. A power factor corrected capacitor charger, according to claim 1, wherein:
the first, second, third and fourth switches are FET transistors.

5. A power factor corrected capacitor charger, according to claim 1, wherein:
the inductor comprises a leakage inductance of the transformer.

6. A power factor corrected capacitor charger, according to claim 1, further comprising:
means for sensing current being supplied by the input full-wave bridge rectifier and providing a signal indicative thereof.

7. A power factor corrected capacitor charger, according to claim 1, further comprising:
means for providing a signal indicative of input current demand.

8. A power factor corrected capacitor charger, according to claim 1, further comprising:
means for controlling closing of the first, second, third and fourth switches in response to sensed current flowing through the inductor and the primary winding.

9. A power factor corrected capacitor charger, according to claim 1, further comprising:
an output rectifier comprising four rectifiers connected as a bridge rectifier having an input and an output;
wherein the secondary winding is connected to the input of the output rectifier.

10. A power factor corrected capacitor charger, according to claim 9, wherein:
a one of the four rectifiers is an electronically controlled switch device.

11. Method of charging a storage capacitor comprising:
providing a full-wave rectified waveform, through switches, to a primary winding of a transformer;
connecting a secondary winding of the transformer, through a bridge rectifier comprising four output rectifiers, at least one of which is a switch, to the storage capacitor;
providing an inductor in series with the primary winding of the transformer;
sensing whether there is input voltage available sufficient to drive current through the inductor and the transformer primary;
if there is input voltage available sufficient to drive current through the inductor and the transformer primary, operating the bridge rectifier as a bridge converter;
if there is not input voltage available sufficient to drive current through the inductor and the transformer primary, switching the at least one output rectifier into a conducting state thus effectively shorting the secondary winding of the transformer and storing energy in the inductor.

12. Method, according to claim 11, further comprising:
in addition to storing energy in the inductor, storing energy in a second capacitor (C1) which is selectively connected to the inductor.

13. Method of charging a capacitor, comprising:
providing a full wave bridge converter having an first bridge rectifier receiving an input voltage and providing a full-wave rectified waveform on a power line and a return line, the full wave bridge converter comprising providing four switches, one of which is connected to the power line, one of which is connected to a storage capacitor and two of which are connected to the return line and further comprising a transformer having a primary winding selectively connected to the power and return lines by the four switches;
characterized by:
providing an inductor in series with the primary winding;
sensing current flowing through the inductor and primary winding:
when the input voltage is adequate, and a first threshold current is sensed, operating the full wave bridge converter in a normal manner;
when the input voltage is insufficient to cause the current to reach the first threshold before a first predetermined timeout period, causing a next portion of the cycle to initiate and, providing that the current at the end of the first timeout period exceeds a second, lower threshold current (+imin), continuing to operate the full wave bridge converter in a normal manner; and
if the current at the end of the first timeout period fails to reach the second threshold at the end of the timeout period, then reversing current in the primary winding and storing energy in the inductor.

14. Method, according to claim 13, further comprising:
when reversing the current in the primary winding, also storing energy in a capacitor.

15. Method of charging a capacitor, comprising:
providing a power converter having four switches selectively connecting a full wave rectified waveform to a primary winding of a transformer;
in a first portion of a cycle, sensing current flowing in the primary winding of the transformer;
controlling closures of the switches based on the sensed current flowing in the primary winding of the transformer; and providing means for shorting a secondary winding of the transformer and for storing energy for driving the transformer in a subsequent portion of the cycle.

16. Method, according to claim 15, wherein:

the stored energy provides a boosted supply voltage for the subsequent portion of the cycle to operate the transformer when an input line voltage is low.

17. Method, according to claim 15, further comprising:

connecting a secondary winding of the transformer to an output bridge rectifier, for charging the capacitor.

18. Method, according to claim 17, wherein:

the output bridge rectifier comprises three diodes and a switch.

19. Method, according to claim 15, wherein:

the means for shorting compries an output bridge rectifier having four rectifying elements connected to a secondary winding of the transformer wherein at least one of the rectifying elements is a switch.

* * * * *